United States Patent
Takahashi

(10) Patent No.: US 8,732,817 B2
(45) Date of Patent: May 20, 2014

(54) SWITCHING HUB, A SYSTEM, A METHOD OF THE SWITCHING HUB AND A PROGRAM THEREOF

(75) Inventor: Yoshikazu Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/317,292

(22) Filed: Oct. 14, 2011

(65) Prior Publication Data

US 2012/0254980 A1   Oct. 4, 2012

(30) Foreign Application Priority Data

Mar. 29, 2011   (JP) ................ 2011-071721

(51) Int. Cl.
- G06F 9/00   (2006.01)
- G06F 15/16  (2006.01)
- G06F 17/00  (2006.01)

(52) U.S. Cl.
USPC .......................................... 726/13; 380/270

(58) Field of Classification Search
USPC .................................................. 726/13, 24
See application file for complete search history.

(56) References Cited

U.S. PATENT DOCUMENTS

| | | | |
|---|---|---|---|
| 2003/0081624 A1* | 5/2003 | Aggarwal et al. | 370/412 |
| 2003/0101340 A1 | 5/2003 | Sato | |
| 2006/0021043 A1 | 1/2006 | Kaneko et al. | |
| 2006/0034292 A1* | 2/2006 | Wakayama et al. | 370/395.5 |
| 2006/0274768 A1 | 12/2006 | Suzuki et al. | |
| 2008/0262991 A1* | 10/2008 | Kapoor et al. | 706/20 |
| 2008/0310416 A1* | 12/2008 | Nozue et al. | 370/392 |
| 2010/0031019 A1* | 2/2010 | Manning et al. | 713/153 |

FOREIGN PATENT DOCUMENTS

| | | |
|---|---|---|
| JP | 2003-163688 A | 6/2003 |
| JP | 2006-339933 A | 12/2006 |
| JP | 2010-62667 A | 3/2010 |
| WO | WO 2004/114599 A1 | 12/2004 |

OTHER PUBLICATIONS

Ronald Ritchey; Representing TCP/IP Connectivity for Topological Analysis of Network Security; Year: 2002; George Mason University; pp. 1-9.*

Japanese Office Action dated Dec. 19, 2012, with partial English translation.

* cited by examiner

*Primary Examiner* — Mohammad W Reza
*Assistant Examiner* — Monjour Rahim
(74) *Attorney, Agent, or Firm* — McGinn IP Law Group, PLLC

(57) ABSTRACT

A switching hub, system and method for restricting a communication between terminals within a second network isolated form a first network. The terminals are connected to the first network or the second network, wherein a terminal with sufficient security level is connected to the first network and a terminal with insufficient security level is connected to the second network. And a communication between the terminals within the second network is restricted.

15 Claims, 7 Drawing Sheets

FIG. 3

CONTENT OF TERMINAL INFORMATION DB 101

| MACHINE NAME | MAC ADDRESS | VIRUS INFECTION | APPLIED POLICY | COLLECTED INFORMATION | POLICY COMPLIANCE CHECK RESULT | EXISTENT NETWORK |
|---|---|---|---|---|---|---|
| ABC | 00:04:ea:da:b4:12 | 0 | A | KB890231 | 0 | VLAN 2 |
| DEF | 00:04:ea:dd:ed:34 | 1 | B | Pattern 7.669.00 | 1 | VLAN 10 |
| .. | .. | .. | .. | .. | .. | .. |

VIRUS INFECTION FLAG
0 : NOT INFECTED
1 : INFECTED

POLICY COMPLIANCE CHECK RESULT FLAG
0 : COMPLIANT
1 : NOT COMPLIANT

CLASSIFICATION LIST

| SOURCE | DESTINATION |
|---|---|
| 00:0d:5e:24:57:e1 | ANY |
| ANY | 00:0d:5e:24:57:e1 |
| ANY | ff:ff:ff:ff:ff:ff |
| 00:04:ea:da:b4:12 | ANY |
| ANY | 00:04:ea:da:b4:12 |
| : | : |

MAC ADDRESS OF MANAGEMENT SERVER 10 :
00:0d:5e:24:57:e1
BROADCAST ADDRESS : ff:ff:ff:ff:ff:ff
MAC ADDRESS OF TERMINAL CONNECTED TO BUSINESS VLAN :
00:04:ea:da:b4:12

FIG. 7

INFORMATION COLLECTION DB 302 OF TERMINAL 30

| APPLIED POLICY | PATCH TO BE APPLIED | ANTIVIRUS SOFTWARE | REGISTRY VALUE TO BE CHECKED |
|---|---|---|---|
| A | KB891325 | Trend Micro Virus Buster | HKEY_LOCAL_MACHINE ... |

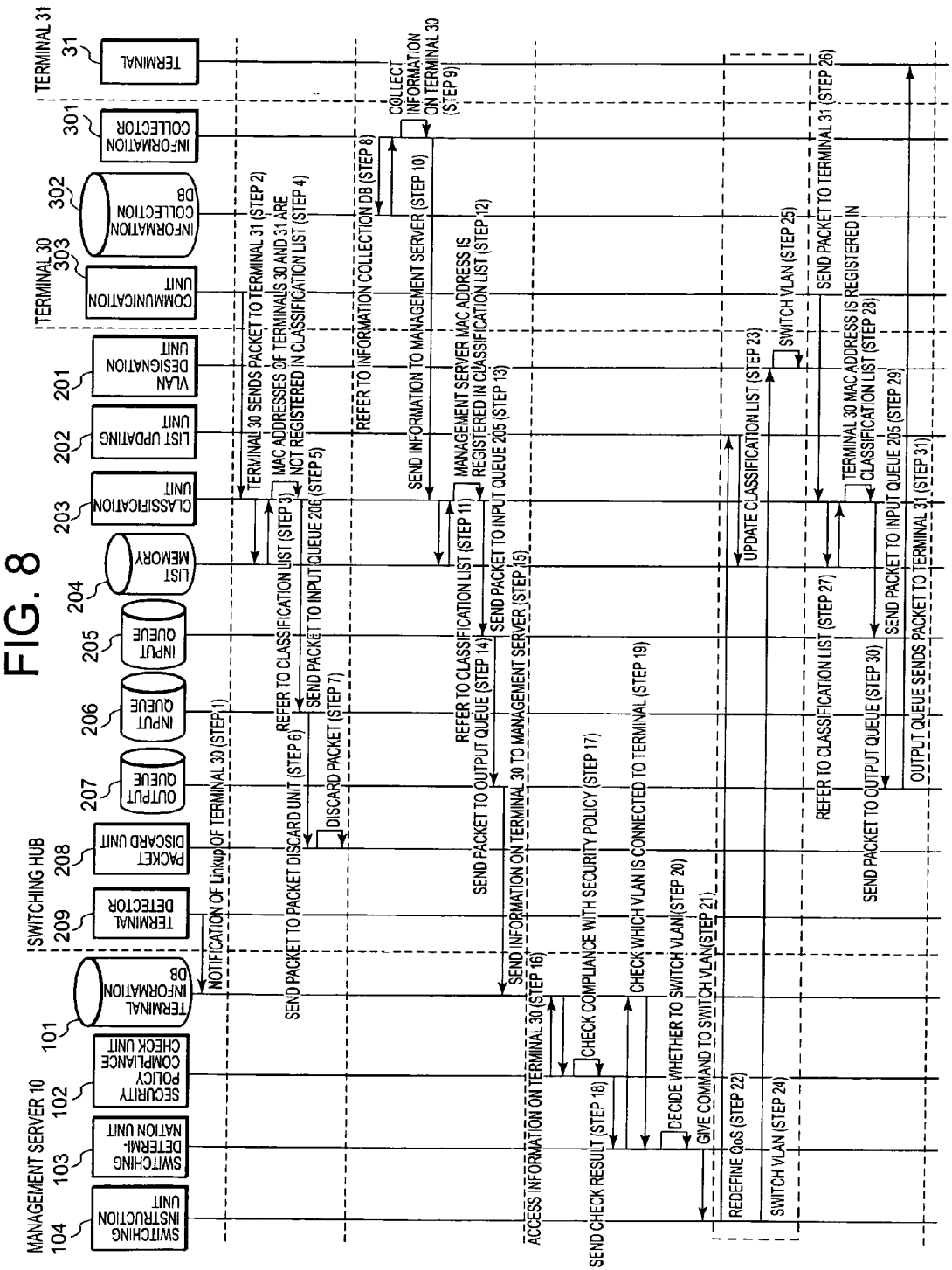

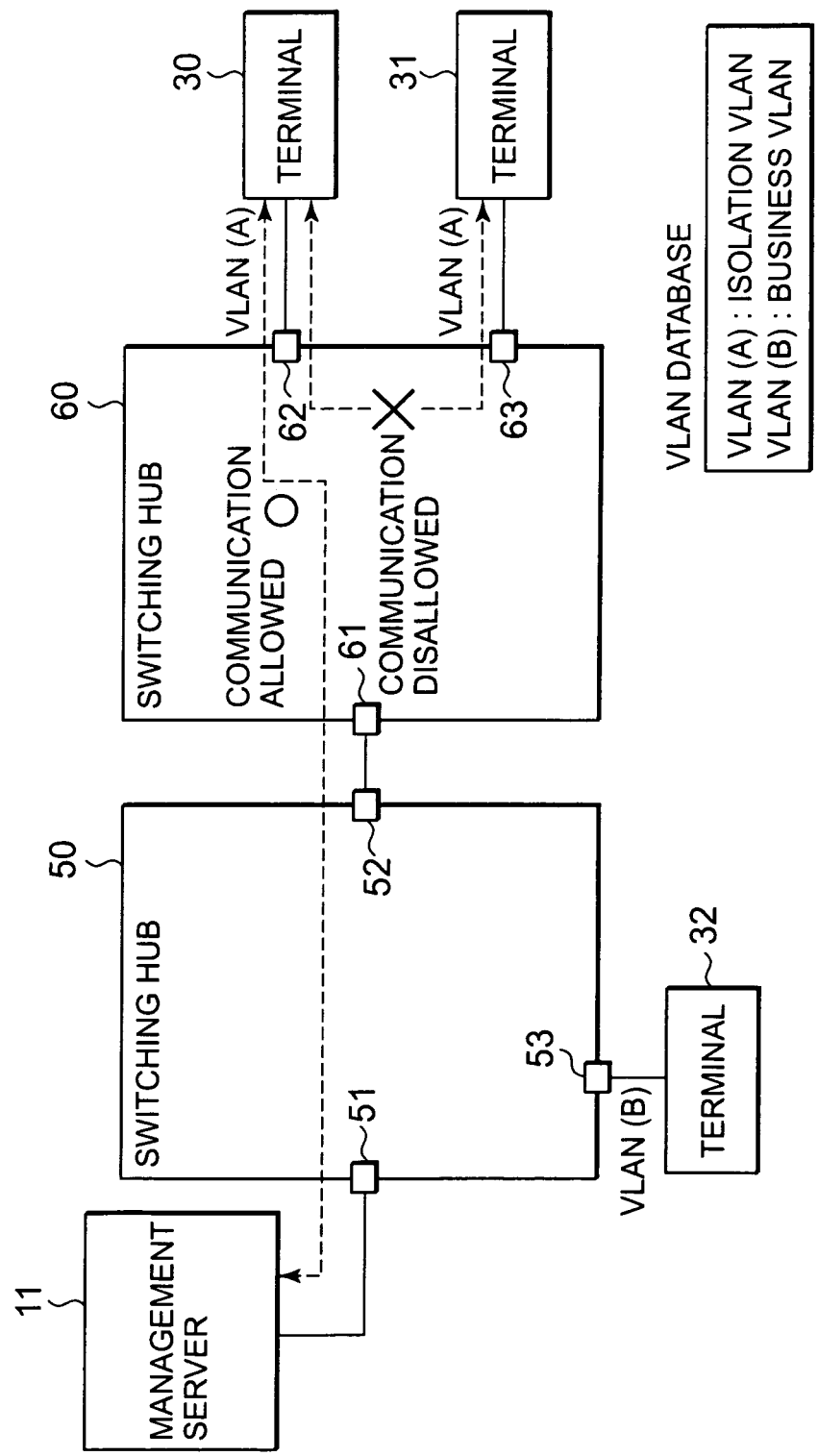

SWITCHING HUB, A SYSTEM, A METHOD OF THE SWITCHING HUB AND A PROGRAM THEREOF

This application is based upon and claims the benefit of priority from Japanese patent application No. 2011-071721, filed on Mar. 29, 2011, the disclosure of which is incorporated herein in its entirety by reference.

BACKGROUND

The exemplary embodiments of the present invention relate to a switching hub, a system, a method of the switching hub and a program thereof. Especially, these embodiments relate to a switching hub with a VLAN (Virtual Local Area Network) function, a system, a method of the switching hub and a program thereof.

Recently, quarantine network systems have attracted attention as one of the techniques to prevent information leaks. Quarantine network systems check how the security patches distributed from vendors are used and the antivirus software pattern files are updated at the terminals connected to the in-house LAN of a company.

Then, the quarantine network systems isolate a terminal not complying with the company's security policy by putting it in an isolation network and compel it to apply a security patch. This improves the in-house security level. The quarantine network systems also isolate a virus—infected terminal by putting it in the isolation network. This also prevents the spread of virus infection.

Generally, this type of quarantine network system uses a hub with a VLAN function for the purpose of stricter network control (for example, see WO2004/114599). This hub, also called a layer 2 switch, controls the network at a lower layer (data link layer) than the layer used for internet protocol communications.

Specifically the hub has a business VLAN and an isolation VLAN. The business VLANs is used to establish a network used for daily business (hereinafter, it is called as "business network"). And the isolation VLAN is used to establish a network where terminals with an insufficient security level is isolated from the business network (hereinafter, it is called as "isolation network").

However, the quarantine network system disclosed in WO2004/114599 has the following problem. In this quarantine network system, virus-infected terminals are put in the same isolation network in which terminals not complying with the security policy are isolated from the business network. Therefore, terminals not complying with the security policy can communicate with virus-infected terminals, which may cause a terminal not complying with the security policy to become virus-infected.

An object of the exemplary embodiments of the present invention is to provide a switching hub, a system, a method of the switching hub and a program thereof which can restrict communications between terminals within the isolation network.

SUMMARY OF THE INVENTION

According to a non-limiting illustrative embodiment, a switching hub connected to terminals comprising: a control unit configured to connect the terminals to a first network or a second network, wherein a terminal with sufficient security level is connected to the first network and a terminal with insufficient security level is connected to the second network isolated form the first network; and a packet processing unit configured to restrict a communication between the terminals within the second network.

According to another non-limiting illustrative embodiment, a system comprising: a switching hub; terminals; and a management server connected to the terminals via the switching hub, wherein the management server is configured to do a security policy check which checks security levels of the terminals and to manage which network the terminals are to be connected to via the switching hub according to a result of the security policy check, a first network or a second network, wherein the second network is isolated from the first network, and wherein the switching hub comprises: a control unit configured to connect the terminals to the first network or the second network, wherein a terminal with sufficient security level is connected to the first network and a terminal with insufficient security level is connected to the second network; and a packet processing unit configured to restrict a communication between the terminals within the second network.

According to still another non-limiting illustrative embodiment, a method of a switching hub connected to terminals, comprising: connecting the terminals to a first network or a second network, wherein a terminal with sufficient security level is connected to the first network and a terminal with insufficient security level is connected to the second network isolated form the first network; and restricting a communication between the terminals within the second network in a restricting step.

According to still another non-limiting illustrative embodiment, a computer readable medium recording thereon a program for enabling a computer to carry out the following: connecting the terminals to a first network or a second network, wherein a terminal with sufficient security level is connected to the first network and a terminal with insufficient security level is connected to the second network isolated form the first network; and restricting a communication between the terminals within the second network in a restricting step.

BRIEF DESCRIPTION OF THE DRAWINGS

Other features and advantages of various embodiments of the present invention will become apparent from the following detailed description and the accompanying drawings, wherein:

FIG. 3 shows an example of information contained in a terminal information database;

FIG. 7 shows an example of the information stored in the information collection database;

FIG. 8 is a sequence diagram showing the operation of the quarantine network system; and FIG. 9 shows the overall configuration of a quarantine network system in a second exemplary embodiment of the present invention.

DETAILED DESCRIPTION

A first exemplary embodiment of the present invention will be described in detail below.

(1) First Exemplary Embodiment

A switching hub and quarantine network system as a system in the first exemplary embodiment will be explained referring to FIGS. 1 to 8.

In this embodiment, there is a premise that a terminal within the isolation VLAN can not communicate with a terminal within the business VLAN.

Also, in this embodiment, the business VLAN is used as an example of a business network as a first network. Also, the isolation VLAN is used as an example of an isolation network as a second network.

System Configuration and Equipment Configuration

Figure 1:
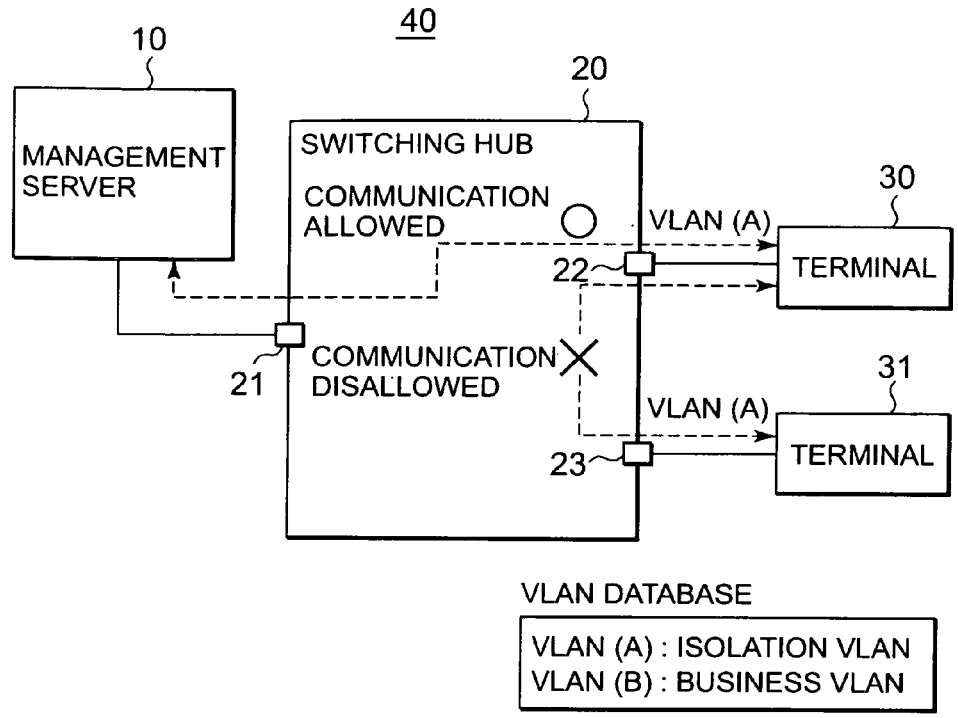
FIG. 1 shows the overall configuration of a quarantine network system in a first exemplary embodiment of the present invention.

First, the overall configuration of the quarantine network system in the first exemplary embodiment is described referring to FIG. 1. FIG. 1 shows the overall configuration of the quarantine network system.

As shown in FIG. 1, the quarantine network system 40 in the first exemplary embodiment includes a management server 10 for managing the network and a switching hub 20 with a VLAN function. In the switching hub 20, the management server 10 is connected to a port 21, a terminal 30 is connected to a port 22, and a terminal 31 is connected to a port 23.

The management server 10 checks whether the terminal 30 and terminal 31 comply with a security policy and sends the switching hub 20 a command to switch the VLAN based on the check result, as an instruction command. The terminals 30 and 31 are ordinary personal computers for business. The switching hub 20 sends and receives packets for communications between devices connected to the ports 21 to 23. In response to a command from the management server 10, the switching hub 20 also designates the VLAN connected to the terminals 30 and 31 as either the business VLAN or an isolation VLAN.

Then, in the quarantine network system 40, the management server 10 carries out a quarantine process using the business VLAN and the isolation VLAN. In FIG. 1, VLAN (A) represents the isolation VLAN and VLAN(B) represents the business VLAN. In addition, in this exemplary embodiment, the switching hub 20 has a function to set priority in packet transmission, namely the "QoS (Quality of Service)" function. By using this function, the switching hub 20 checks whether the received packet is to be dropped or transmitted to a destination. And the switching hub 20 drops or transmits the packet based on the check result.

"QoS" is a technique to process a specific communication preferentially using the "Class of Service" values, etc. contained in packets on a network. QoS is defined in RFC2211 and RFC2212.

Configuration of the Management Server

Figure 2:
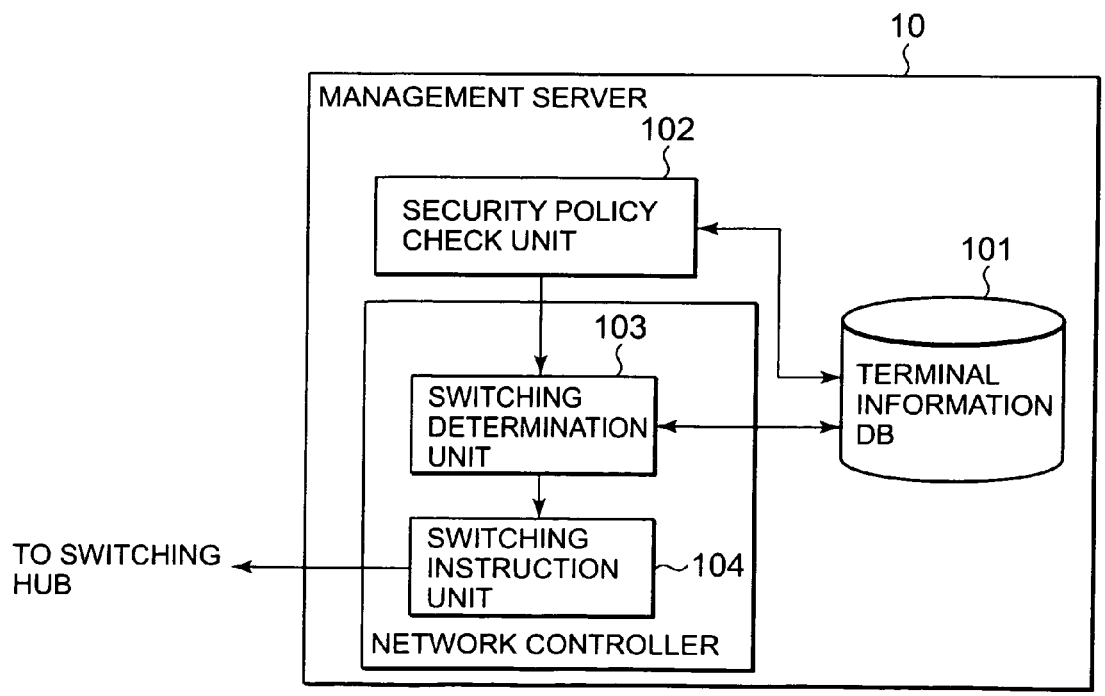
FIG. 2 is a block diagram showing the configuration of a management server.

The configuration of the management server in this exemplary embodiment will be described in FIG. 2. FIG. 2 is a block diagram showing the configuration of the management server in this embodiment.

As shown in FIG. 2, the management serer 10 includes a terminal information database 101 as a storage unit, a security policy check unit 102, and a network controller 105. The terminal information database 101 contains information on terminals connected to the switching hub 20. A concrete example of terminal information will be explained later referring to FIG. 3.

The security policy check unit 102 decides whether the terminals connected to the switching hub 20 comply with a security policy. Specifically, the security policy check unit 102 checks whether each terminal complies with a predetermined security policy and sends the check result to the network controller 105.

According to the decision made by the security policy check unit 102, the network controller 105 selects either the business VLAN or isolation VLAN as a network where the terminal is connected and orders the switching hub 20 to connect the terminal to the selected VLAN.

Specifically the network controller 105 includes a VLAN switch decision unit 103 and a Switching instruction unit 104. Based on the check result of the security policy check unit 102, the VLAN switch decision unit 103 decides whether or not to switch the VLAN currently connected to the terminal and sends the decision to the Switching instruction unit 104.

Based on the decision sent from the VLAN switch decision unit 103, the Switching instruction unit 104 sends the switching hub 20 a command to order the terminal to switch the VLAN.

A concrete example of the terminal information contained in the terminal information database 101 is explained below. FIG. 3 shows an example of the information contained in the terminal information database in the first exemplary embodiment. The database is hereinafter abbreviated as DB.

As shown in FIG. 3, the terminal information DB 101 contains the name of the terminal connected to the switching hub 20 (machine name), MAC address of the terminal, virus infection, applied security policy, information collected by the terminal (collected information), result of security policy compliance check, and name of the network currently connected to the terminal.

Configuration of the Switching Hub

Figure 4:
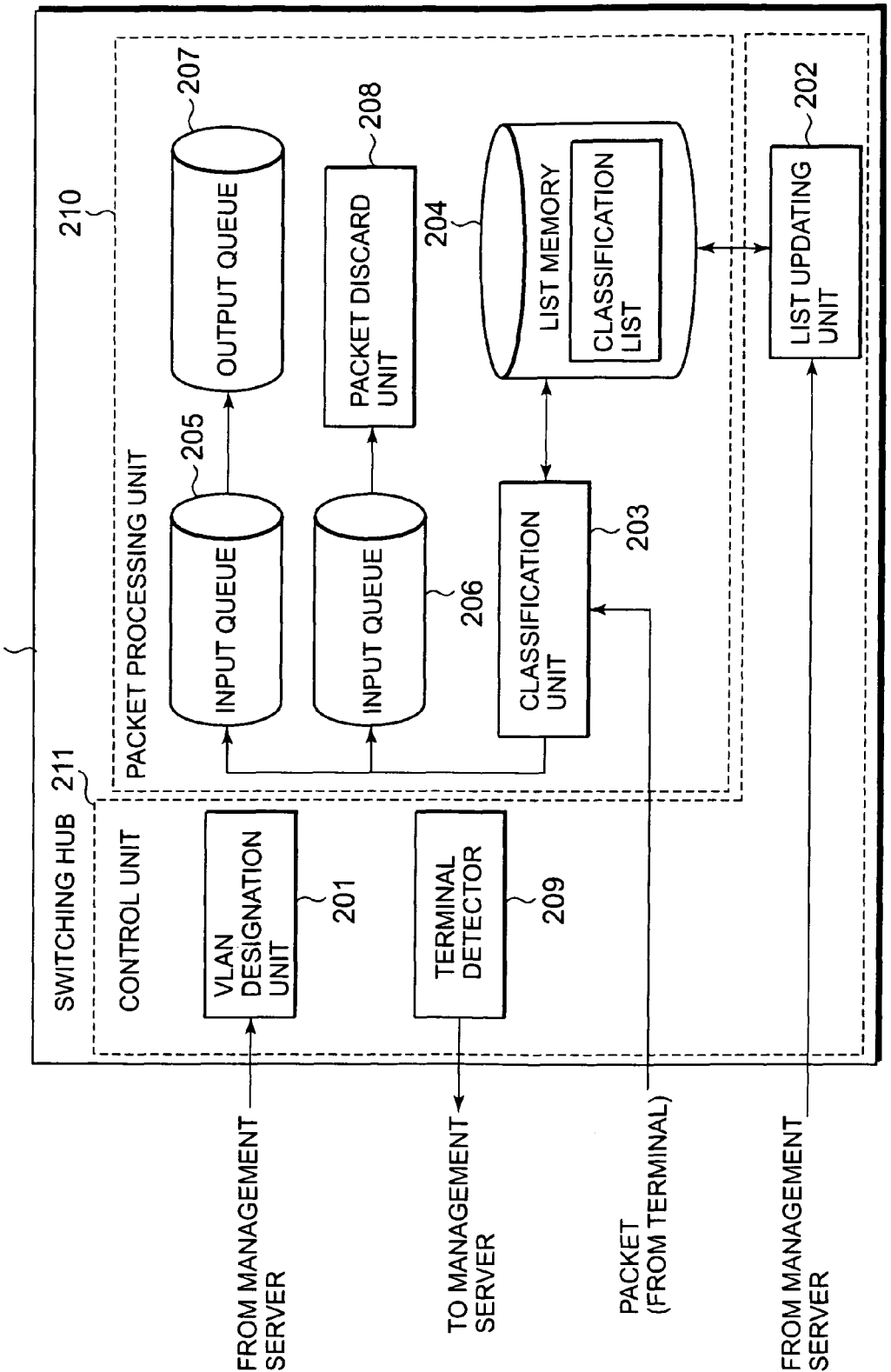
FIG. 4 is a block diagram showing the configuration of a switching hub.

The configuration of the switching hub 20 in the first exemplary embodiment will be described referring to FIG. 4. FIG. 4 is a block diagram showing the configuration of the switching hub in the first exemplary embodiment.

The switching hub 20 shown in FIG. 4 is a layer 2 switch which has a VLAN function. As shown in FIG. 4, the switching hub 20 includes a VLAN designation unit 201 and a packet processing unit 210.

In response to the command from the management server 10 (see FIGS. 1 and 2), the VLAN designation unit 201 designates the VLAN connected to each of the terminals (terminals 30 and 31 in the example of FIG. 1) connected to the switching hub 20 as either a business VLAN or isolation VLAN.

The packet processing unit 210 receives a packet from a terminal and makes a decision based on the MAC address of the source (sender) of the received packet and the MAC address of the destination (receiver) thereof as to whether or not communication is taking place between terminals in the isolation VLAN (VLAN(A) in FIG. 1). If the packet processing unit 210 decides that communication is taking place between terminals in the isolation VLAN, it discards the received packet.

As described above, in the first exemplary embodiment the switching hub 20 can restrict communications between terminals in the isolation network when the business network and isolation network are established by using VLANs. Therefore, if a terminal not complying with the security policy and a virus-infected terminal coexist within the isolation network, the terminal not complying with the security policy can be prevented from being virus-infected.

Figures 5, 6:
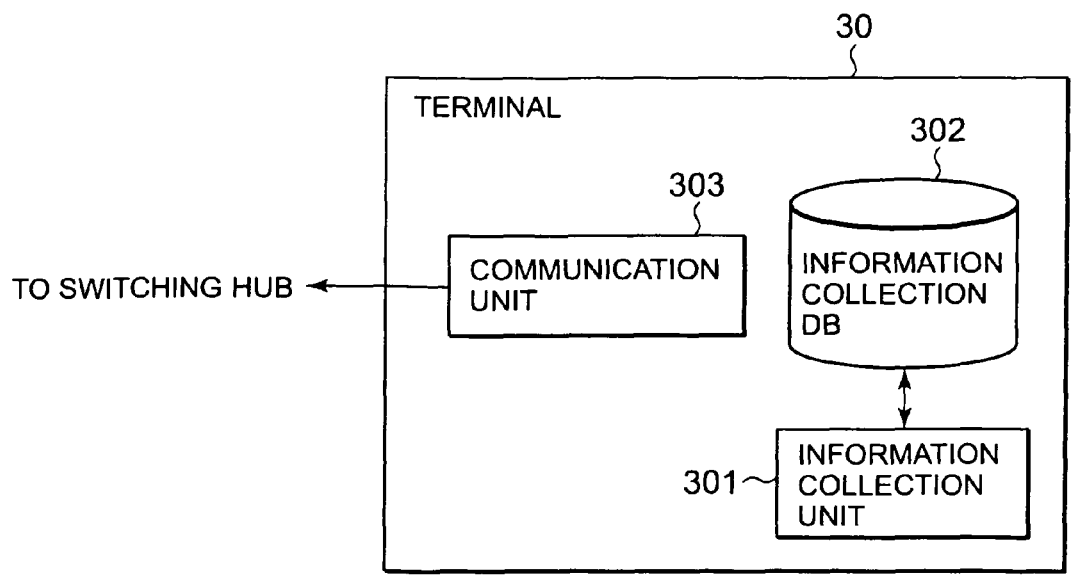
FIG. 5 shows an example of the list.
FIG. 6 is a block diagram showing the configuration of a terminal as a quarantine object.

Referring to FIG. 5 as well as FIG. 4, the configuration of the switching hub 20 in the first exemplary embodiment is described in further detail. As shown in FIG. 4, in the first exemplary embodiment, the switching hub 20 includes a list updating unit 202 and a terminal detector 209 in addition to the VLAN designation unit 201 and packet processing unit 210.

In the first exemplary embodiment, as described in FIG. 4, the switching hub 20 has control unit 211 and packet processing unit 210. The control unit has VLAN designation unit 201, terminal detector 209 and list update unit 202. The packet processing unit 210 has input queue 205, 206, output queue 207, packet discard unit 208, classification unit 203 and list memory 204.

If a terminal is connected to the port 22 or 23 of the switching hub 20, the terminal detector 209 detects the connection of the terminal and acquires information from the terminal and sends it to the management server 10.

In this embodiment, the packet processing unit 210 has a QoS function and uses it to decide whether or not the communication is between terminals within the isolation VLAN. If the communication is between terminals within the isolation VLAN, the packet processing unit 210 discards the packet.

Specifically, the packet processing unit 210 includes a classification unit 203, a list memory 204, input queues 205 and 206, an output queue 207, and a packet discard unit 208 which discards packets.

The list memory 204 stores a list which at least contains the MAC address of the management server 10. Specifically, the list used in the first exemplary embodiment is a classification list which is used for classification with the QoS function.

Hereinafter the list stored in the list memory 204 maybe referred to as the "classification list." FIG. 5 shows an example of the list used in the first exemplary embodiment.

As shown in FIG. 5, like an access control list, the classification list contains the MAC address of the source and the MAC address of the destination on a per-packet basis. In addition, the MAC address of the management server 10 and the broadcast address are previously registered in the classification list.

According to the classification list, the classification unit 203 determines to which queue the received packet is assigned. The input queue 205 is a queue to which top priority is given. The input queue 206 is a queue which is designed to discard incoming packets. The output queue 207 has a function to transmit packets.

In the packet processing unit 210, the classification unit 203 compares the MAC address of the source of the received packet and the MAC address of the destination with the classification list (see FIG. 5).

As a result of the comparison, if the MAC address of the source is not registered in the classification list and the MAC address of the destination is not the MAC address of the management server 10, it is decided that the communication is taking place between terminals within the isolation VLAN. Therefore, the classification unit 203 sends the received packet to the input queue 206. In this case, the input queue 206 sends the packet to the packet discard unit 208 to discard the packet.

On the other hand, if the MAC address of the source is registered in the classification list or the MAC address of the destination is the MAC address of the management server, it is decided that no communication is taking place between terminals within the isolation VLAN. Therefore, the classification unit 203 sends the received packet to the input queue 205. The input queue 205, given top priority, immediately sends the packet to the output queue 207, which then sends it to the destination.

If the management server 10 orders the list updating unit 202 to connect a specific terminal to the business VLAN, the list updating unit 202 registers the MAC address of that terminal in the classification list shown in FIG. 5. As a consequence, the packet processing unit 210 enables packet transmission from the specific terminal. Consequently the packet processing unit 210 permits the specific terminal to send a packet as the source. In the first exemplary embodiment, the list updating unit 202 updates the QoS parameters.

Configuration of the Terminal

The configuration of the terminal as a quarantine object will be described in FIG. 6. FIG. 6 is a block diagram showing the configuration of the terminal as a quarantine terminal in the first exemplary embodiment. As shown in FIG. 6, the terminal includes an information collector 301, an information collection DB 302, and a communication unit 303. The terminal 31 has the same configuration as the terminal 30 though not shown in FIG. 6.

According to the security policy applied to the terminal 30, the information collector 301 collects information on the terminal which is required for security policy compliance check, such as the antivirus software version and the patch file version applied to the software in use.

The information collection DB 302 contains the information on the terminal itself collected by the data collector 301 and the applied security policy. The communication block 303 sends a packet from the terminal 30 to another terminal.

The information contained in the information collection DB 302 is described below. FIG. 7 shows an example of the information stored in the information collection DB used in the first exemplary embodiment. As shown in FIG. 7, the information collection DB 302 stores the security policy applied to the terminal 30, the patch file list to be applied under the security policy, installed antivirus software (or list of pattern files to be used by the antivirus software), and the registry value to be checked.

Operation of the System

It is described how the quarantine network system in the first exemplary embodiment operates will be described in FIG. 8. FIG. 8 is a sequence diagram showing the operation of the quarantine network system in the first exemplary embodiment. FIG. 8 shows the steps carried out by the management server 10, switching hub 20 and terminal 30.

As shown in FIG. 8, first, when the terminal 30 is connected to one of the ports of the switching hub 20, the terminal detector 209 of the switching hub 20 detects that the terminal 30 is connected to the switching hub 20. Then, the terminal detector 209 sends information on the terminal 30 including its MAC address to the management server 10 and the information is registered in the terminal information DB 101 of the management server 10 (Step 1).

If the security policy has not been applied to the terminal 30 connected to the switching hub 20 yet, it means that the terminal 30 is connected to the isolation VLAN. At this time, if the terminal 30 is going to communicate with the terminal 31 connected to the same isolation VLAN, a packet is sent from the communication unit 303 of the terminal 30 to the classification unit 203 of the switching hub 20 (Step 2).

Then, the classification unit 203 refers to the classification list stored in the list memory 204 (Step 3). Furthermore, the classification unit 203 compares the MAC address of the source of the received packet and the MAC address of the destination thereof with the MAC addresses registered in the classification list 204 (Step 4).

In this case, the MAC address of the source of the packet does not exist in the classification list, so the classification unit 203 sends the packet to the input queue 206 (Step 5).

Since the input queue 206 is designed to discard an incoming packet, it passes the received packet to the packet discard unit 208 (Step 6). Then, the packet discard unit 208, having received the packet, discards the packet (Step 7).

As described above, when security policy compliance check is not done on the terminal 30 connected to the switching hub 20, the MAC address of the terminal 30 does not exist in the classification list. Therefore, the packet sent from the terminal 30 to the terminal 31 is discarded.

Next, in order to request the management server 10 to check the terminal 30's compliance with the security policy, the information collector 301 of the terminal 30 refers to the information collection DB 302 and confirms the currently applied security policy (Step 8). According to the security policy, the data collector 301 selects information on the terminal 30 to be collected and collects the selected information (Step 9). The information collected at Step 9 is sent from the terminal 30 to the management server 10. At the same time, the switching hub 20 receives a packet from the terminal 30. The packet received by the switching hub 20 is passed to the classification unit 203 (Step 10).

Next, the classification unit 203 refers to the classification list stored in the list memory 204 (Step 11) and checks whether the MAC addresses of the destination and source of the packet are registered in the classification list (Step 12). In this case, since the MAC address of the management server 10 exists in the packet destination list, the classification unit 203 passes the packet to the input queue 205 (Step 13).

The input queue 205, given top priority in packet transmission, immediately passes the packet to the output queue 207 (Step 14). Then, the output queue 207 sends the packet to the management server 10. Having received the packet, the management server 10 stores the information on the terminal 30 contained in the packet, in the terminal information DB 101 (Step 15). Steps 8 to 15 are periodically carried out. In other words, information on the terminal is periodically collected and uploaded to the management server 10.

When the management server 10 checks whether the terminal 30 complies with the security policy, the security policy check unit 102 of the management server 10 refers to the terminal information DB 101 to access the information on the terminal 30 (Step 16).

Next, the security policy check unit 102 checks whether the terminal 30 complies with the security policy, based on the information registered at Step 15 (Step 17). The security policy check unit 102 notifies the VLAN switch decision unit 103 of the check result (Step 18).

The VLAN switch decision unit 103 receives the check result from the security policy check unit 102 and refers to the terminal information DB 101 to check whether the VLAN currently connected to the terminal 30 is the business VLAN or isolation VLAN (Step 19).

Next, the VLAN switch decision unit 103 decides whether it is necessary to switch the VLAN connected to the terminal 30, based on the check result received from the security policy check unit 102 and the information from the terminal information DB 101 (Step 20). The VLAN switch decision unit 103 notifies the Switching instruction unit 104 of its decision (Step 21).

Here, if the terminal 30 complies with the security policy, the VLAN switch decision unit 103 decides that it is necessary to switch the VLAN connected to the terminal 30 from the isolation VLAN to the business VLAN. Therefore, the VLAN switch decision unit 103 orders the Switching instruction unit 104 to switch the VLAN.

In this case, according to the VLAN switch command from the VLAN switch decision unit 103, the Switching instruction unit 104 sends a command to change the VLAN to the list updating unit 202 and VLAN designation unit 201 of the switching hub 20 (Step 22, Step 24)

In the switching hub 20 which has received the VLAN switch command, the list updating unit 202 registers the MAC address of the terminal 30 in the classification list stored in the list memory 204 (Step 23). Also, the VLAN designation unit 201 switches the isolation VLAN currently connected to the terminal 30 to the business VLAN (Step 25).

Steps 16 to 20 are periodically carried out to check periodically whether the terminal complies with the security policy. At that time, if it is necessary to change the VLAN designation, Steps 21 to 25 are carried out.

After that, the terminal 30 connected to the business VLAN sends a packet from its communication unit 303 to the terminal 31 connected to the same business VLAN in order to communicate with the terminal 31 (Step 26). As Step 26 is carried out, the classification unit 203 of the switching hub 20 receives the packet being sent from the terminal 30 to the terminal 31. Then the classification unit 203 refers to the classification list stored in the list memory (Step 27).

Then, the classification unit 203 compares the MAC address of the source of the received packet and the MAC address of the destination with the classification list (Step 28). In this case, the MAC address of the terminal 30 exists in the classification list, so the packet is passed to the input queue 205 (Step 29).

Having received the packet, the input queue 205 passes the packet to the output queue 207 (Step 30) and then the output queue 207 sends it to the terminal 31 (Step 31). Packet transmission can be made between the terminals 30 and 31 in this way.

Effect of the First Exemplary Embodiment

As discussed above, in the first exemplary embodiment, two VLANs, the business VLAN and the isolation VLAN, are established through the switching hub 20 and the switching hub 20 has a QoS function. The QoS function is used to restrict communications between terminals connected to the isolation VLAN.

Specifically the switching hub 20 checks the MAC addresses of the source and destination of the received packet with the classification list for controlling QoS and discards the packet used for communication between terminals connected to the isolation VLAN. On the other hand, even if a terminal is connected to the isolation VLAN, the switching hub 20 increases the priority of communication between the terminal and the management server to enable communication between them. Consequently, according to the first exemplary embodiment, virus infection between terminals within the isolation VLAN is prevented.

(2) Second Exemplary Embodiment

A switching hub and quarantine network system in the second exemplary embodiment will be described in FIG. 9. FIG. 9 shows the overall configuration of the quarantine network system in the second exemplary embodiment.

As shown in FIG. 9, in the second exemplary embodiment, the quarantine network system 41 includes a management server 11 and switching hubs 50 and 60. The quarantine network system 41 in the second exemplary embodiment is different from the quarantine network system 40 shown in FIG. 1 in the first exemplary embodiment in that more than one switching hub are connected.

In the second exemplary embodiment, the switching hubs 50 and 60 have the same configuration and functionality as the switching hub 20 shown in FIGS. 1 and 4 in the first exemplary embodiment. The switching hubs 50 and 60 are interconnected through their trunk ports (port 52 and port 61), and it is possible to transmit/receive packets between the switching hubs 50 and 60 in both the business VLAN and isolation VLAN.

In the example shown in FIG. 9, the management server 11 is connected to the port 51 of the switching hub 50. The terminals 30 and 31 as shown in FIG. 1 are connected to the ports 62 and 63 of the switching hub 60 respectively. In the switching hub 50, the port 53 is designated as a port for the business VLAN and connected to a terminal 32 which complies with the security policy. The terminals 30 to 32 shown in FIG. 9 have the same configuration and functionality as the terminal shown in FIG. 6.

In the second exemplary embodiment, the management server 11 has the same configuration as the management server 10 shown in FIGS. 1 and 2 but it is different from the management server 10 in the function of the network controller (VLAN switch decision unit and switching instruction unit). This difference is explained below referring to FIG. 8.

Although the sequence of the quarantine network system 40 in the second exemplary embodiment is basically the same as that in the first exemplary embodiment, they are different in the process of switching the VLAN for a terminal from the isolation VLAN to the business VLAN. The second exemplary embodiment is different from the first exemplary embodiment in Steps 22 to 25, namely the steps surrounded by dotted lines in the sequence diagram of FIG. 8.

Specifically, in the management server 11, the Switching instruction unit 104 (FIG. 2) orders the list updating unit 202 of the switching hub 50 (FIG. 4) to update the classification list (Step 23). At this time, in the second exemplary embodiment, the Switching instruction unit 104 orders all the switching hubs, namely not only the switching hub 50 but also the switching hub 60, to update their classification lists. As a consequence, the classification lists are updated for both the terminal 50 and terminal 60.

However, the Switching instruction unit 104 sends a command only to the switching hub connected to the terminal for which the VLAN is to be switched (Steps 23 and 24). For example, if the terminal for which the VLAN is to be switched is the terminal 30, the Switching instruct ion unit 104 sends a VLAN switch command only to the switching hub 60 to switch the VLAN.

As discussed so far, according to the second exemplary embodiment, even when plural switching hubs are used, virus infection between terminals within the isolation VLAN is prevented.

Although in the first and second exemplary embodiment of the present invention, terminal 30 and 31 are connected to either the business VLAN or the isolation VLAN, the business VLAN is an example of the business network and the isolation VLAN is an example of the isolation network. So these embodiments are not limited to the business VLAN and the isolation VLAN.

The above-described embodiments are preferred embodiments of the present invention, however, the scope of the invention is not limited to only the above embodiments, but the invention can be implemented with various modifications without departing from the scope of the invention.

What is claimed is:

1. A switching hub connected to terminals, comprising:
a control unit configured to connect the terminals to a first network or a second network, a terminal with sufficient security level being connected to the first network and a terminal with insufficient security level being connected to the second network isolated from the first network; and
a packet processing unit configured to restrict a communication between the terminals within the second network, wherein the packet processing unit determines whether a packet is for the communication between the terminals within the second network based on a source address and a destination address of the packet, and if the packet is for the communication between the terminals within the second network, then the packet processing unit drops the packet for the communication,
wherein the packet processing unit comprises a list memory configured to register a list including an address of a terminal connected to the first network, and the packet processing unit compares the source address and the destination address of the packet with an address registered in the list, and
wherein if the source address is not registered in the list and the destination address is not the address of a management server, then the packet processing unit recognizes that the packet is for the communication between the terminals within the second network, and if the source address is registered in the list or the destination address is the address of the management server, then the packet processing unit recognizes that the packet is not for the communication between the terminals within the second network.

2. The switching hub according to claim 1, wherein the terminals are connected to the management server via the switching hub, and
wherein the list includes at least one of a broadcast address and an address of the management server.

3. The switching hub according to claim 2, wherein the source address and the destination address of the packet, the address of the management and the broadcast address are MAC address (Media Access Control address).

4. The switching hub according to claim 1, wherein the first and second networks are VLAN (Virtual Local Area Network).

5. The switching hub according to claim 1, wherein the packet processing unit comprises:
a first input queue to which top priority is given;
a second input queue which is designed to discard incoming packets;
a classification unit which:
receives a packet from a terminal;
compares an address of the source of the received packet and an address of a destination of the received packet with a classification list; and
based on the comparison, determines to assign the received packet to the first or second input queue;
an output queue which comprises a function to transmit the received packet; and
a packet discard unit for discarding the received packet.

6. The switching hub according to claim 5, wherein the control unit comprises:
a network designation unit which designates the network connected to each of the terminals as either the first network or the second network;
a terminal detector which detects a connection of the terminals to a port of the switching hub, and acquires information from the terminals; and
a list updating unit which updates the list in the list memory of the packet processing unit.

7. A system comprising:
a switching hub;
terminals; and
a management server connected to the terminals via the switching hub,
wherein the management server is configured to do a security policy check which checks security levels of the terminals and to manage which network the terminals are to be connected to via the switching hub according to a result of the security policy check, a fist network or a second network, wherein the second network is isolated from the first network, wherein the switching hub comprises:
a control unit configured to connect the terminals to the first network or the second network, a terminal with sufficient security level being connected to the first network and a terminal with insufficient security level being connected to the second network; and
a packet processing unit configured to restrict a communication between the terminals within the second network, wherein the packet processing unit determines whether a packet is for the communication between the terminals within the second network based on a source address and a destination address of the packet, and if the packet is for the communication between the terminals within the second network, then the packet processing unit drops the packet for the communication, wherein the packet processing unit comprises a list memory configured to register a list including an address of a terminal connected to the first network, and the packet processing unit compares the source address and the destination address of the packet with an address registered in the list, and wherein if the source address is not registered in the list and the destination address is not the address of the management server, then the packet processing unit recognizes that the packet is for the communication between the terminals within the second network, and if the source address is registered in the list or the destination address is the address of the management server, then the packet processing unit recognizes that the packet is not for the communication between the terminals within the second network.

8. The system according to claim 7, wherein the list includes at least one of a broadcast address and an address of the management server.

9. The system according to claim 8, wherein the source address and the destination address of the packet, the address of the management and the broadcast address are MAC address (Media Access Control address).

10. The system according to claim 7, further comprising another switching hub with the same configuration as the switching hub between the management server and the switching hub,
wherein the management server sends an instruction command for connecting a terminal to the first network or the second network to only the switching hub, and
wherein the lists of both the switching hub and another switching hub are updated when receiving the instruction command for connecting the terminal to the first network.

11. The system according to claim 7, wherein the management server comprises:
a security policy check unit configured to do a security policy check which checks the security levels of the terminals;
a network controller configured to manage which network the terminals are to be connected to via the switching hub according to a result of the security policy check, the first network or the second network; and
a storage unit configured to store information regarding the terminal connected to the management server via the switching hub.

12. The system according to claim 11,
wherein the network controller comprises:
a switching determination unit configured to select the first network or the second network as a network where the terminal is to be connected via the switching hub according to the result of the security policy check ;and
a switching instruction unit configured to send the instruction command for connecting the terminals to the selected network via the switching hub.

13. A method of a switching hub connected to terminals, comprising:
connecting the terminals to a first network or a second network, a terminal with sufficient security level being connected to the first network and a terminal with insufficient security level being connected to the second network isolated from the first network; and
restricting a communication between the terminals within the second network in a restricting step, the restricting of the communication comprising:
determining whether a packet is for the communication between the terminals within the second network based on a source address and a destination address of the packet, and if the packet is for the communication between the terminals within the second network, then dropping the packet for the communication;
referring to a list including an address of a terminal connected to the first network, and comparing the source address and the destination address of the packet with an address registered in the list; and
if the source address is not registered in the list and the destination address is not the address of a management server, then recognizing that the packet is for the communication between the terminals within the second network, and if the source address is registered in the list or the destination address is the address of the management server, then recognizing that the packet is not for the communication between the terminals within the second network.

14. The method of the switching hub according to claim 13, wherein the restricting step comprises:
determining whether or not a packet is for the communication between the terminals within the second network based on a source address and a destination address of the packet; and
dropping the packet for the communication.

15. A computer readable device recording thereon a program for enabling a computer to carry out the following:
connecting the terminals to a first network or a second network, wherein a terminal with sufficient security level is connected to the first network and a terminal with insufficient security level is connected to the second network isolated from the first network; and restricting a communication between the terminals within the second network in a restricting step, the restricting of the communication comprising:
determining whether a packet is for the communication between the terminals within the second network based on a source address and a destination address of the packet, and if the packet is for the communication between the terminals within the second network, then dropping the packet for the communication;
referring to a list including an address of a terminal connected to the first network, and comparing the source address and the destination address of the packet with an address registered in the list; and if the source address is not registered in the list and the destination address is not the address of a management server, then recognizing that the packet is for the communication between the terminals within the second network, and if the source address is registered in the list or the destination address is the address of the management server, then recognizing that the packet is not for the communication between the terminals within the second network.

* * * * *